United States Patent
Okada

(10) Patent No.: US 7,477,290 B2
(45) Date of Patent: Jan. 13, 2009

(54) IMAGE RECORDING/REPRODUCING APPARATUS, IMAGE PICK-UP APPARATUS, AND COLOR ABERRATION CORRECTING METHOD

(75) Inventor: Miyuki Okada, Tokyo (JP)

(73) Assignee: Sony Corporation, Tokyo (JP)

( * ) Notice: Subject to any disclaimer, the term of this patent is extended or adjusted under 35 U.S.C. 154(b) by 463 days.

(21) Appl. No.: 10/544,506

(22) PCT Filed: Dec. 24, 2003

(86) PCT No.: PCT/JP03/16621

§ 371 (c)(1),
(2), (4) Date: Apr. 5, 2006

(87) PCT Pub. No.: WO2004/071076

PCT Pub. Date: Aug. 19, 2004

(65) Prior Publication Data

US 2006/0232681 A1  Oct. 19, 2006

(30) Foreign Application Priority Data

Feb. 6, 2003 (JP) .............................. 2003-030147

(51) Int. Cl.
*H04N 5/228* (2006.01)
*H04N 5/217* (2006.01)
*G06K 9/40* (2006.01)

(52) U.S. Cl. ................. 348/208.6; 348/222.1; 348/241; 382/275

(58) Field of Classification Search ............ 348/208.99, 348/208.6, 208.12, 222.1, 241; 382/275
See application file for complete search history.

(56) References Cited

U.S. PATENT DOCUMENTS 5,353,056 A * 10/1994 Westerink et al. ........... 348/263

(Continued)

FOREIGN PATENT DOCUMENTS

EP 0 410 419 A2 1/1991

(Continued)

*Primary Examiner*—John M Villecco
(74) *Attorney, Agent, or Firm*—Oblon, Spivak, McClelland, Maier & Neustadt, P.C.

(57) ABSTRACT

An image recording and reproducing apparatus, an image pickup apparatus, and a chromatic aberration correcting method capable of performing excellent correction processing of an aperture amount of an iris and a lens image height of an object in an image pickup lens are provided.

An output signal from a camera signal processing circuit 4 is selected by a switch 5 to be supplied to a chromatic aberration correction unit 6. An aperture amount of an iris 31 provided in an image pickup lens 1 and coordinates of a pixel, to which correction processing is performed, from the chromatic aberration correction unit 6 are supplied to a conversion ratio calculation unit 10. A driving state such as a zoom focal length and focal position of the image pickup lens 1 and a camera shake correction vector are supplied to the conversion ratio calculation unit 10. Then, a conversion ratio for each color is obtained to be supplied to the chromatic aberration correction unit 6. Further, a signal corrected in the chromatic aberration correction unit 6 is compressed in a data compression circuit 15 to be supplied to a recording medium in a recording and reproducing apparatus 17. A signal reproduced from the recording and reproducing apparatus 17 is decompressed in a data decompression circuit 18 to be supplied to the switch 5.

Accordingly, picture-quality degradation occurring in a miniaturized image pickup lens can be corrected by processing a picked-up image signal, and excellent correction processing can be performed on an aperture amount of an iris and a lens image height of an object in the image pickup lens.

24 Claims, 7 Drawing Sheets

U.S. PATENT DOCUMENTS

| | | |
|---|---|---|
| 5,905,530 A | 5/1999 | Yokota et al. |
| 6,747,702 B1 * | 6/2004 | Harrigan ..................... 348/241 |
| 7,321,685 B2 * | 1/2008 | Okada et al. ................ 382/167 |
| 7,391,926 B2 * | 6/2008 | Arazaki ...................... 382/275 |
| 7,397,499 B2 * | 7/2008 | Okada et al. ........... 348/208.13 |
| 2004/0218071 A1 * | 11/2004 | Chauville et al. .......... 348/262 |
| 2004/0240750 A1 * | 12/2004 | Chauville et al. .......... 382/275 |
| 2004/0247201 A1 * | 12/2004 | Arazaki ...................... 382/275 |
| 2005/0105822 A1 * | 5/2005 | Narita ........................ 382/275 |
| 2005/0179788 A1 * | 8/2005 | Okada et al. ............. 348/222.1 |

FOREIGN PATENT DOCUMENTS

| | | |
|---|---|---|
| FR | 2830401 A1 * | 4/2003 |
| JP | 11-161773 | 6/1999 |
| JP | 2002-190979 | 7/2002 |
| JP | 2002-344978 | 11/2002 |
| JP | 2003-255424 | 9/2003 |

* cited by examiner

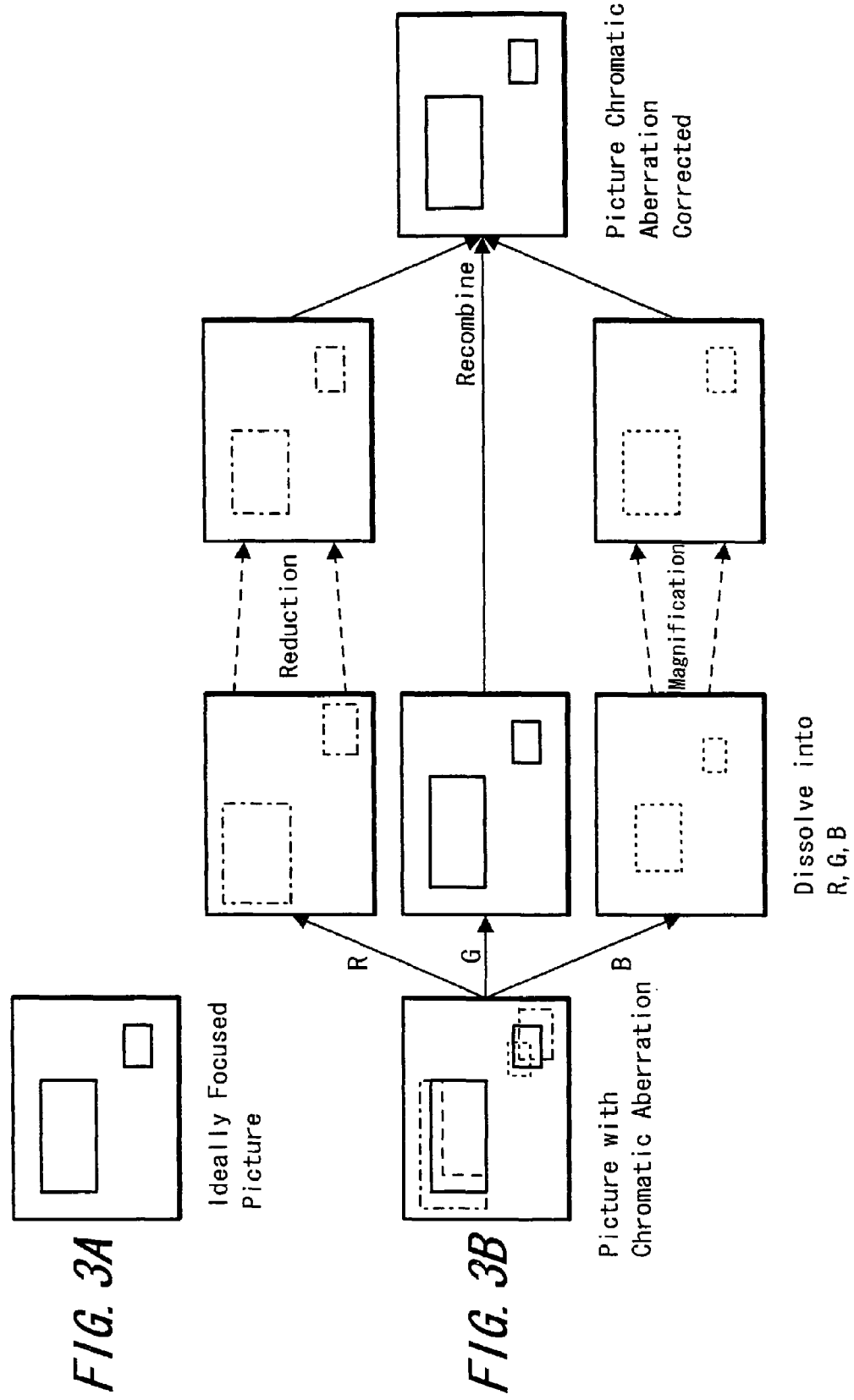

IMAGE RECORDING/REPRODUCING APPARATUS, IMAGE PICK-UP APPARATUS, AND COLOR ABERRATION CORRECTING METHOD

TECHNICAL FIELD

The present invention relates to an image recording and reproducing apparatus, an image pickup apparatus, and a chromatic aberration correcting method, in which chromatic aberration occurred when picking up image light that passes through an image pickup lens can favorably be corrected, and particularly relates to an image recording and reproducing apparatus, an image pickup apparatus, and a chromatic aberration correcting method which are suitable to be used in a video camera or digital still camera, for example.

BACKGROUND ART

A video camera or digital still camera, for example, includes an image pickup lens, image pickup means for converting image light that passes through this image pickup lens into an electrical image signal, and camera signal processing means for processing this image signal, from which an output signal is output to the outside and is recorded in a recording medium.

Here, as the image pickup lens, what is called an optical lens is used. Further, image light from an object which passes through this image pickup lens is separated into light of three primary colors red (R), green (G), and blue (B) by a spectroscopic filter, for example; is focused on an image pickup surface in the image pickup means formed of a CCD, a CMOS sensor, and the like; and is converted into an electrical image signal.

On the other hand, miniaturization is rapidly advanced in a video camera or digital still camera, and also the miniaturization is required for an image pickup lens. Accordingly, in order to miniaturize the image pickup lens, one as before in which multiple lenses are combined and used is often replaced with a small one using a single lens or a few lenses. In addition, in order to achieve miniaturization, a lens in prior art is replaced with a lens having a smaller diameter and is replaced with a lens of inexpensive materials for the purpose of price reduction. However, with such miniaturized image pickup lens, it becomes difficult to sufficiently control picture-quality degradation such as so-called chromatic aberration occurred in a lens.

Specifically, in the optical lens, a refractive index of the lens differs at each wavelength of red (R), green (G), and blue (B) separated by, for example, a spectroscopic filter, so that a phenomenon occurs in which a red (R) image is formed outside a green (G) image and a blue (B) image is formed inside the green (G) image, as shown in, for example, FIG. 5. Therefore, there is a problem in which even in the case where a monochrome image is taken, for example, a color blurring (color shift) appears at an edge of the image.

Thus, in order to control the deterioration of picture quality such as color blurring or resolution degradation due to such chromatic difference of magnification (also called lateral chromatic aberration), conventionally a large number of lenses were combined to perform correction inside the image pickup lens. However, in the above-described miniaturized image pickup lens, it becomes difficult to sufficiently control such deterioration of picture quality only inside the image pickup lens.

To cope with this difficulty, an apparatus disclosed in, for example, Published Japanese Patent Application No. H5-3568 is previously proposed as means for controlling the above-described deterioration of picture quality such as color blurring or resolution degradation due to the chromatic difference of magnification.

Specifically, in the apparatus disclosed, image signals of each color of R, G, B derived from a CCD (image pickup device) are once converted into digital data and temporarily stored in individual field memory, respectively; further, based on a driving state of the image pickup lens such as a zoom focal length and a focal position, each image stored in each field memory is enlarged or reduced by individually moving vectors of each entire field memory and then R, G, B are again combined for correcting the color shift occurring in the image pickup lens of a video camera.

Meanwhile, when an image is taken by a small-sized video camera or digital still camera, for example, held by hand, there is a possibility that an image blurring due to so-called camera shake or the like may happen. Thus, for the purpose of removing the disadvantage such as the image blurring, what is called a camera shake correction device is installed in the small-sized video camera or digital still camera. FIG. 6 shows a block diagram of the video camera or digital still camera in which the camera shake correction device is installed.

In FIG. 6, image light from an object (not shown) passing through an image pickup lens 50 forms an image on the image pickup surface of an image pickup means 51 including CCD, CMOS sensors and the like and is converted into an electric image signal including, for example, an intensity (Y) signal and two color-difference (Cb, Cr) signals. The image signal is supplied to a camera-signal processing circuit 52, where signal processing such as so-called γ correction is made to generate an ordinary image signal used for general-purpose video equipment.

On the other hand, in order to detect so-called camera shake, angular velocities due to the camera shake in Pitch and Yaw directions are detected using, for example, two gyro-sensors 53P and 53Y in this example. Further, a zoom focal length of the image pickup lens 50 operated by, for example, a user is detected from the image pickup lens 50. Additionally, to detect the zoom focal length, an operational signal from a manual input means 54 operated by a user for example, can be employed.

Further, the angular-velocity signals detected by the gyro-sensors 53P and 53Y are supplied to high-pass filters (HPF) 55P and 55Y, where DC components are removed; on the other hand, data on the above-described zoom focal length is supplied to a table 56 and necessary operational coefficients are found from those data; and the operational coefficients are supplied to multipliers 57P and 57Y, and are multiplied there by signals from the high-pass filters 55P and 55Y. Furthermore, output signals from the multipliers 57P and 57Y are further supplied to integrators 58P and 58Y, respectively.

Accordingly, information on angles of the image pickup lens 50 varied by the camera shake is derived from those integrators 58P and 58Y. The angular information on the camera shake is supplied to, for example, the image pickup means 51 through limiter circuits 59P and 59Y and a position at which the image signal is taken out from the image pickup means 51 is controlled. Specifically, for example, the image pickup means 51 is provided with a image pickup surface wider than a size of the original image, and a necessary image is taken out from the image pickup surface so as to cancel out the fluctuation due to camera shake.

In this way, so-called camera shake correction is performed in the small-sized video camera or digital still camera. Additionally, the following methods are also practiced as means for performing the camera shake correction other than controlling the position to take out the image signal from the camera means 51 as described above, in which all image signals picked up by the image pickup means 51 are once stored in a memory 60 and then a position at which the image signal is read out from the memory 60 is controlled, or a partial lens position of the image pickup lens 50 is shifted for the correction.

Furthermore, the information on angles of the image pickup lens 50 varied by the camera shake can also be taken out by other means than that using the above-described gyrosensors 53P and 53Y; for example, as shown in FIG. 7, by storing the image signal from the image pickup means 51 in a frame memory 61 and then comparing the image signals prior to and subsequent to the frame memory 61 with each other in a comparator circuit 62, the angular information on the camera shake can be calculated from displacement of an image in the background and the like. In addition, the calculated angular information on camera shake can be utilized in all the above-described camera shake correction means.

However, it is verified that, when such camera shake correction is performed, if the compensation for the picture-quality deterioration such as color blurring or resolution degradation due to the chromatic difference of magnification is attempted, sufficient correction cannot be made. Specifically, in the above-described device, when the vector of each entire field memory is moved, the center must correspond with an optical axis of the image pickup lens; however, if the camera shake correction is performed, the position of the optical axis is moved and it is difficult to correspond with the center.

For this reason, the compensation for picture-quality deterioration due to chromatic aberration, for example, could not be performed simultaneously with the camera shake correction in the past. However, in conventional kinds of system having a small number of pixels, the picture-quality deterioration, for example, due to chromatic aberration is less noticeable, particularly when taking a picture which requires the camera shake correction. Lately, however, as the result that the increase in the number of pixels of a picture has been demanded, the influence of the picture-quality deterioration due to chromatic aberration or the like becomes conspicuous under every situation.

Specifically, when compensation for the picture-quality degradation is performed by making the image of each color enlarged and reduced as described above, there has been such a problem that the camera shake correction can not be performed concurrently. Therefore, inventors of this patent application have previously proposed an image recording and reproducing apparatus, an image pickup apparatus, and a chromatic aberration correcting method to solve the above described problem between the compensation for the picture-quality degradation and the camera shake correction in Japanese Patent Application No. 2002-59191.

However, as a result of verification of the color shift occurred in the image pickup lens in the above-described small-sized video camera or digital still camera, an amount of color shift occurring is also influenced by an aperture amount of an iris and a lens image height of an object in the image pickup lens. It should be noted that the lens image height of the object is a distance from optical axis-centered coordinates in an image of the relevant object.

FIG. 8 shows a relation between an aperture amount of an iris (horizontal axis) and a shift amount in a picture-forming position of light of three primary colors (red: R, green: G, and blue: B) (vertical axis) at points of the image height 0.0, the image height 0.5, the image height 0.7, the image height 0.9, and the image height 1.0 respectively from the bottom, where the lens center is expressed as the image height 0.0 and a lens edge is expressed as the image height 1.0. On the left side of the diagram is shown the characteristic of a vertical plane (TANGENTIAL) to the optical axis and on the right side of the diagram is shown the characteristic of a horizontal plane (SAGITIAL) to the optical axis. Further, a zoom position and a focal position are fixed at certain points.

Specifically, in each of the curves shown in FIG. 8 is plotted for each color (R, G, B) an amount of aberration generated depending on the position where light of the point of each image height passes in the iris aperture shown in FIG. 5. Note that in the TANGENTIAL characteristic curves on the left side, the positive side of the horizontal axis shows the characteristic of light passing through an upper part of the iris aperture and the negative side thereof shows the characteristic of light passing through a lower part of the iris aperture. Further, the negative side is omitted in the SAGITIAL characteristic curves on the right side, because the characteristic appears symmetrically.

Furthermore, a unit of the vertical axis is a millimeter for both TANGENTIAL and SAGITIAL, and the positive side shows the outer side of the lens and the negative side shows the side close to the center of the lens. Moreover, the characteristic curve of green (G) passes through the zero point, and the other characteristic curves of red (R) and blue (B) are shown by relative values to green (G).

Accordingly, it is understood from FIG. 8 that the direction where the chromatic aberration appears and the amount thereof are fluctuated depending on the aperture amount of the iris in the image pickup lens and the lens image height of the object. Hence, there arises necessity for correcting not only the chromatic aberration occurred in the above-described lens, but also color shift generated in the image pickup lens with respect to the aperture amount of the iris and the lens image height of the object.

This application is made in view of the above and aims to solve the problems of: picture-quality degradation such as the color blurring and resolution degradation caused by the magnification chromatic aberration due to the miniaturization of the image pickup lens and the like, difficulties in sufficiently controlling such picture-quality degradation only by the image pickup lens, and further the necessity for correcting the color shift generated in the image pickup lens also with respect to the aperture amount of the iris in the image pickup lens and the lens image height of the object.

DISCLOSURE OF THE INVENTION

In claim 1 of the present invention, means for enlarging or reducing an image for each of the primary color signals and means for detecting a driving state of an iris and a lens image height of an object therein are used to control a conversion coefficient and optical axis-centered coordinates for the magnification or reduction of the image in accordance with a detected signal.

Accordingly, picture-quality degradation that occurs in a miniaturized image pickup lens can be corrected by processing of a picked-up image signal, and excellent correction processing can also be performed with respect to an aperture amount of the iris and the lens image height of the object in the image pickup lens.

Further, according to claim 2 of the present invention, since signal conversion means for converting or inversely converting a signal output from resolution conversion means into an external output image signal or a recording image signal and external output means for outputting the external output image signal and/or recording and reproducing means for recording or reproducing the recording image signal in a recording medium are included, the image signal on which the correction processing is performed can be recorded in a recording medium such as a flexible disk and semiconductor memory card and can also be output to an external video apparatus and the like.

According to claim 3 of the present invention, since the signal output from camera signal processing means can be recorded in the recording medium by the recording and reproducing means and information on the driving state of the image pickup lens and on an amount of camera shake correction detected by detection means when picking up the image is recorded in the recording medium together with the signal output from the camera signal processing means, the image signal can be recorded excellently even in the case where there is no time for the correction processing in continuous shooting and the like.

According to claim 4 of the present invention, switch means for switching between the signal output from the camera signal processing means and an image signal from arbitrary external input means or recording and reproducing means is included, a signal from the switch means is supplied to the color signal conversion means, and control means is provided with a user interface for performing arbitrary setting to the conversion coefficient and the optical axis-centered coordinates for the magnification or reduction, so that correction processing of an image signal recorded by other camera apparatuses can be performed excellently.

According to claim 5 of the present invention, the information on the driving state of the image pickup lens and the amount of camera shake correction detected by the detection means when picking up the image signal is recorded together with the image signal in the recording medium reproduced by the recording and reproducing means, the conversion coefficient and the optical axis-centered coordinates for the magnification or reduction in the resolution conversion means are controlled in accordance with the information reproduced by the recording and reproducing means, so that the correction processing of the image signal recorded in the recording medium can be performed excellently using the same camera apparatus.

According to claim 6 of the present invention, a difference between coordinates of the detected pixel and the optical axis-centered coordinates on the screen is used to detect the lens image height of the object, so that the correction processing of the image signal can be performed excellently.

According to claim 7 of the present invention, automatic focus adjusting means capable of controlling a focusing position is included, coordinates of the controlled focusing position represent the detected pixels of the whole screen and are used for detecting the lens image height of the object, so that a chromatic aberration correction for an-unfocused portion can be simplified, and a circuit scale, processing time, power consumption, control software, lens data storage memory, and the like can be reduced greatly.

According to claim 8 of the present invention, the driving state of the image pickup lens and the amount of camera shake correction are further detected, the conversion coefficient and the optical axis-centered coordinates for the magnification or reduction in the resolution conversion means is controlled in accordance with said further detected output in addition to said detected output, so that further excellent correction processing of the image signal can be performed.

Further, according to claim 9 of the present invention, means for enlarging or reducing an image for each of the primary color signals and means for detecting a driving state of an iris and a lens image height of an object therein are used to control a conversion coefficient and optical axis-centered coordinates for the magnification or reduction of the image in accordance with a detected signal.

Accordingly, picture-quality degradation that occurs in a miniaturized image pickup lens can be corrected by processing of a picked-up image signal, and excellent correction processing can also be performed with respect to an aperture amount of the iris and the lens image height of the object in the image pickup lens.

Further, according to claim 10 of the present invention, since signal conversion means for converting or inversely converting a signal output from resolution conversion means into an external output image signal or a recording image signal and external output means for outputting the external output image signal and/or recording and reproducing means for recording or reproducing the recording image signal in a recording medium are included, the image signal on which the correction processing is performed can be recorded in a recording medium such as a flexible disk and semiconductor memory card and can also be output to an external video apparatus and the like.

According to claim 11 of the present invention, since the signal output from camera signal processing means can be recorded in the recording medium by the recording and reproducing means and information on the driving state of the image pickup lens and on an amount of camera shake correction detected by detection means when picking up the image is recorded in the recording medium together with the signal output from the camera signal processing means, the image signal can be recorded excellently even in the case where there is no time for the correction processing in continuous shooting and the like.

According to claim 12 of the present invention, switch means for switching between the signal output from the camera signal processing means and an image signal from arbitrary external input means or recording and reproducing means is included, a signal from the switch means is supplied to the color signal conversion means, and control means is provided with a user interface for performing arbitrary setting to the conversion coefficient and the optical axis-centered coordinates for the magnification or reduction, so that correction processing of an image signal recorded by other camera apparatuses can be performed excellently.

According to claim 13 of the present invention, the information on the driving state of the image pickup lens and the amount of camera shake correction detected by the detection means when picking up the image signal is recorded together with the image signal in the recording medium reproduced by the recording and reproducing means, the conversion coefficient and the optical axis-centered coordinates for the magnification or reduction in the resolution conversion means are controlled in accordance with the information reproduced by the recording and reproducing means, so that the correction processing of the image signal recorded in the recording medium can be performed excellently using the same camera apparatus.

According to claim 14 of the present invention, a difference between coordinates of the detected pixel and the optical axis-centered coordinates on the screen is used to detect the lens image height of the object, so that the correction processing of the image signal can be performed excellently.

According to claim 15 of the present invention, automatic focus adjusting means capable of controlling a focusing position is included, coordinates of the controlled focusing position represent the detected pixels of the whole screen and are used for detecting the lens image height of the object, so that a chromatic aberration correction for an unfocused portion can be simplified, and a circuit scale, processing time, power consumption, control software, lens data storage memory, and the like can be reduced greatly.

According to claim 16 of the present invention, the driving state of the image pickup lens and the amount of camera shake correction are further detected, the conversion coefficient for the magnification or reduction in the resolution conversion means is controlled including the detected detection output, and control for the magnification or reduction of the optical axis-centered coordinates is performed, so that further excellent correction processing of the image signal can be performed.

Furthermore, according to claim 17 of the present invention, means for enlarging or reducing an image for each of the primary color signals and means for detecting in the image pickup lens a driving state of an iris and a lens image height of an object are used to control a conversion coefficient and optical axis-centered coordinates for the magnification or reduction of the image in accordance with a detected signal.

Accordingly, picture-quality degradation that occurs in a miniaturized image pickup lens can be corrected by processing of a picked-up image signal, and excellent correction processing can also be performed with respect to an aperture amount of the iris and the lens image height of the object in the image pickup lens.

Further, according to claim 18 of the present invention, the signal output from the resolution conversion means is converted into an external output image signal or a recording image signal and the external output image signal is output and/or the recording image signal is recorded in the recording medium, so that the image signal on which the correction processing is performed can be recorded in a recording medium such as a flexible disk and semiconductor memory card and can also be output to an external video apparatus and the like.

According to claim 19 of the present invention, since the signal output from camera signal processing means can be recorded in the recording medium and information on the driving state of an iris and the lens image height of the object in the image pickup lens detected when picking up the image, or correction information corresponding thereto is recorded in the recording medium together with the output signal, the image signal can be recorded excellently even in the case where there is no time for the correction processing in continuous shooting and the like.

According to claim 20 of the present invention, switch means for switching between the signal output from the camera signal processing means and an image signal from an arbitrary external input or recording medium is included, a signal from the switch means is converted into at least three primary color signals, the magnification or reduction of the image is performed with respect to each color of the primary color signals, and arbitrary setting is performed to the conversion coefficient and the optical axis-centered coordinates for the magnification or reduction, so that correction processing of an image signal recorded by other camera apparatuses can be performed excellently.

According to claim 21 of the present invention, the information on the driving state of the iris and on the amount of camera shake correction in the image pickup lens detected by the detection means when picking up the image signal or the correction information corresponding thereto is recorded in the recording medium reproduced by the recording and reproducing means together with the image signal, and the conversion coefficient and the optical axis-centered coordinates for the magnification or reduction are controlled in accordance with the information reproduced, so that the correction processing of the image signal recorded in the recording medium can be performed excellently using the same camera apparatus.

According to claim 22 of the present invention, a difference between coordinates of the detected pixel and the optical axis-centered coordinates on the screen is used to detect the lens image height of the object, so that the correction processing of the image signal can be performed excellently.

According to claim 23 of the present invention, automatic focus adjusting means capable of controlling a focusing position is included, coordinates of the controlled focusing position represent the detected pixels of the whole screen and are used for detecting the lens image height of the object, so that a chromatic aberration correction for an unfocused portion can be simplified, and a circuit scale, processing time, power consumption, control software, lens data storage memory, and the like can be reduced greatly.

According to claim 24 of the present invention, the driving state of the image pickup lens and the amount of camera shake correction are further detected, the conversion coefficient for the magnification or reduction in the resolution conversion means is controlled including the detected detection output, and control for the magnification or reduction of the optical axis-centered coordinates is performed, so that further excellent correction processing of the image signal can be performed.

BRIEF DESCRIPTION OF DRAWINGS

FIGS. 3A and 3B are diagrams for explaining an operation thereof;

BEST MODE FOR CARRYING OUT THE INVENTION

The present invention includes means for performing magnification or reduction of an image with respect to each color of primary color signal and means for detecting an aperture amount of an iris and a lens image height of an object in an image pickup lens, in which a conversion coefficient and optical axis-centered coordinates for magnification or reduction of an image are controlled in accordance with a detection output; and according to this, picture-quality degradation occurred in a miniaturized image pickup lens can be corrected by processing of a picked-up image signal, and excellent correction processing can also be performed in the image pickup with respect to the aperture amount of the iris and the lens image height of the object.

Figure 1:
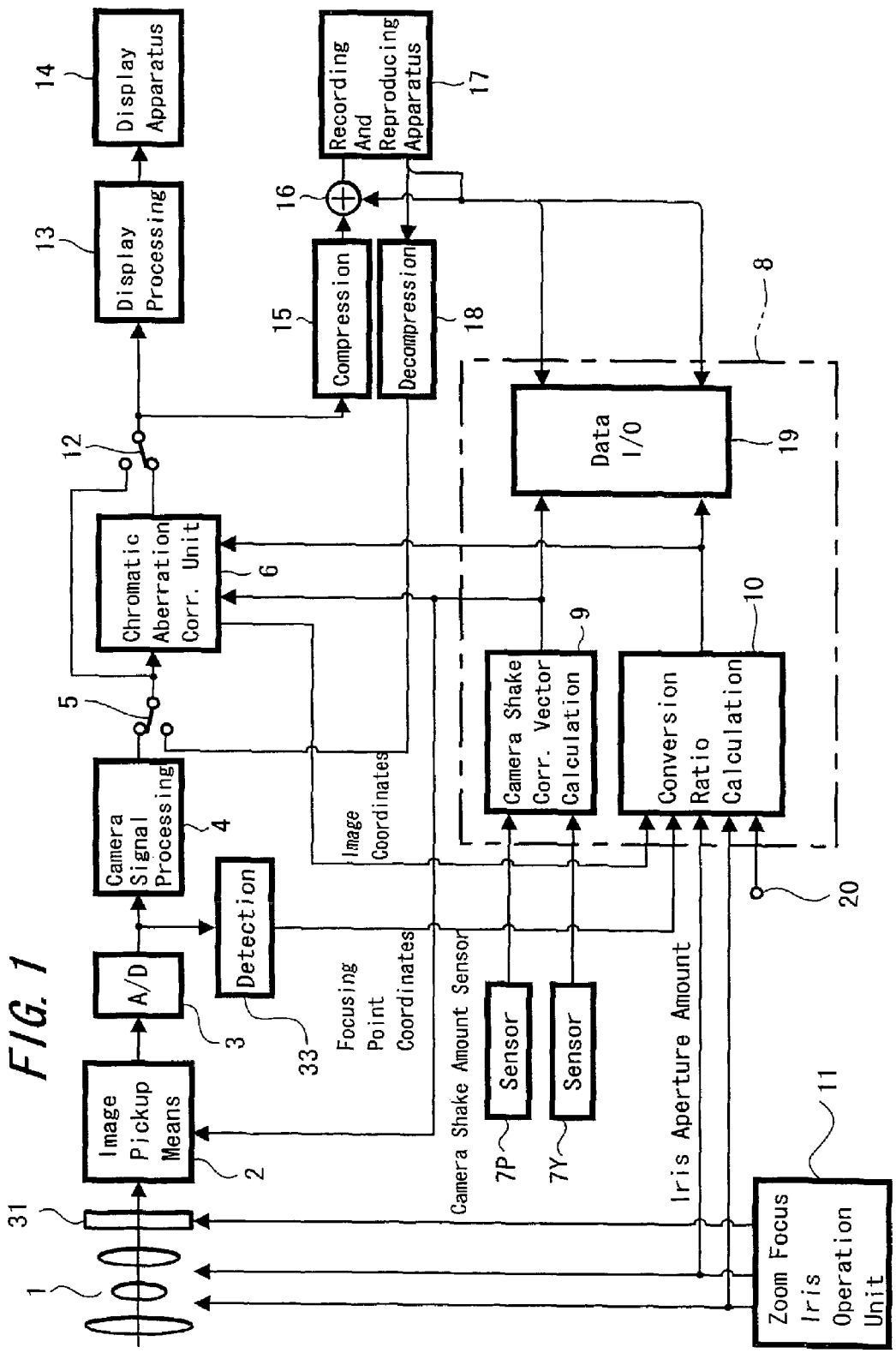
FIG. 1 is a block diagram showing a configuration of a video camera or digital still camera to which an image recording and reproducing apparatus, an image pickup apparatus or a chromatic aberration correcting method according to an embodiment of the present invention is applied.

Hereinafter, the present invention is explained referring to the accompanied drawings; FIG. 1 is a block diagram showing an embodiment of a configuration of a video camera or digital still camera to which an image recording and reproducing apparatus, an image pickup apparatus, and a chromatic aberration correcting method according to the present invention are applied.

In FIG. 1, image light from an object (not illustrated) is focused on an image pickup surface of an image pickup means 2 made of a CCD, CMOS sensor or the like through an image pickup lens 1, and is converted into an electrical image signal including a luminance signal (Y) and two color-difference (Cb, Cr) signals, for example.

This image signal is supplied to an A/D conversion circuit 3, and the image signal of an analog format is converted into image data of a digital format. Further, this converted image data is supplied to a camera signal processing circuit 4, signal processing of what is called γ-correction and the like is performed in digital processing, and an ordinary image signal used for a general-purpose video apparatus is formed. Further, an output signal from the camera signal processing circuit 4 is selected by a switch 5 and is supplied to a chromatic aberration correction unit 6.

On the other hand, angular velocities in the directions of pitch and yaw due to a camera shake are detected using two sensors 7P and 7Y, for example, and the detected signals are supplied to a camera shake correction vector calculation unit 9 in a control microcomputer 8, for example. Further, such driving state of the image pickup lens 1 as a zoom focal length and focal position is detected, and is supplied to a conversion ratio calculation unit 10. It should be noted that an operation signal input by a user from a manual operation input unit 11, for example, may be used for the detection of the driving state of the image pickup lens 1.

Figure 6:
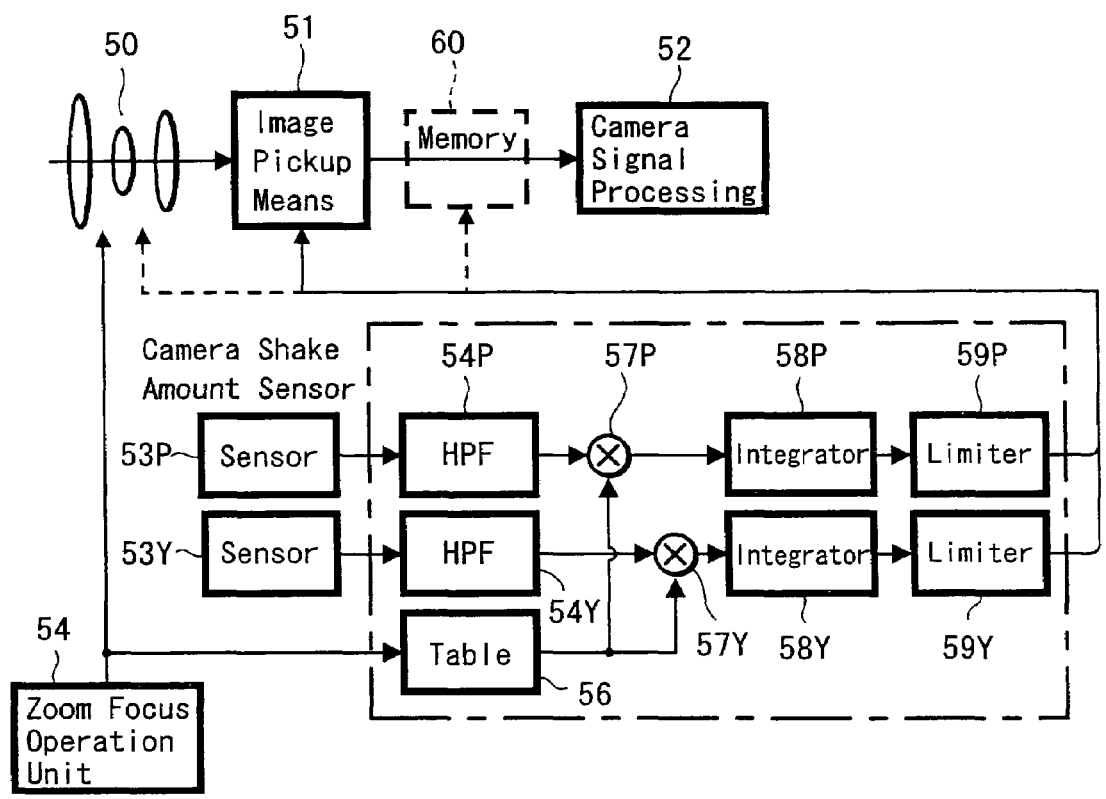
FIG. 6 is a block diagram for explaining a conventional camera shake correction means.
Figure 7:
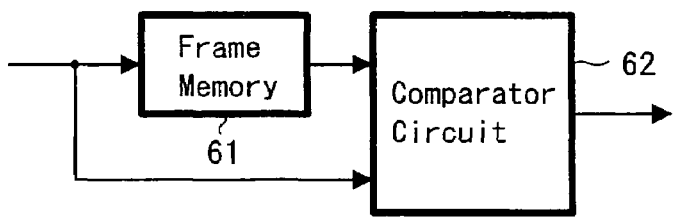
FIG. 7 is a diagram for explaining thereof.

Further, operations equivalent to processing encircled by an alternate long and short dashed line in the above-described circuit configuration shown in FIG. 6 are performed, for example, in the camera shake correction vector calculation unit 9 in the control microcomputer 8, for example, with which the angular information of the image pickup lens 1 fluctuated by the camera shake is obtained. Furthermore, a camera shake correction vector calculated in this control microcomputer 8 is supplied to, for example, the image pickup means 2 to perform the camera shake correction.

At the same time, an optical axis-centered shift vector of the image pickup lens 1 is obtained from this camera shake correction vector, and is supplied to the chromatic aberration correction unit 6. Specifically, the camera shake correction vector is equivalent to a shift of the optical axis center of the image pickup lens 1, and a position at which the image signal is taken out from the image pickup means 2, for example, is controlled in accordance with this camera shake correction vector. Then, the optical axis-centered shift vector in the taken-out image signal is obtained by reversing a positive and negative sign of this camera shake correction vector.

Further, an aperture amount of an iris 31 provided in the image pickup lens 1 is detected, and is supplied to the conversion ratio calculation unit 10. Hereupon, a control signal from an automatic aperture mechanism (not illustrated) using a photometric means or an operation signal from the manual operation input means 11, for example, can be used for detecting the aperture amount of the iris 31. Specifically, these control signal and operation signal can be used as a detection signal of the aperture amount of the iris 31.

Further, coordinates of a pixel to which correction processing is being performed are supplied from the chromatic aberration correction unit 6 to the conversion ratio calculation unit 10, and a difference from the above-described shift vector of the optical axis center of the image pickup lens 1 obtained from the camera shake correction vector is obtained as a lens image height of the object. Then, a conversion ratio for each color is calculated in the control microcomputer 8 in accordance with the aperture amount of the iris 31 and lens image height of the object, and the driving state such as above-described zoom focal length and focal position of the image pickup lens 1.

Figure 5:
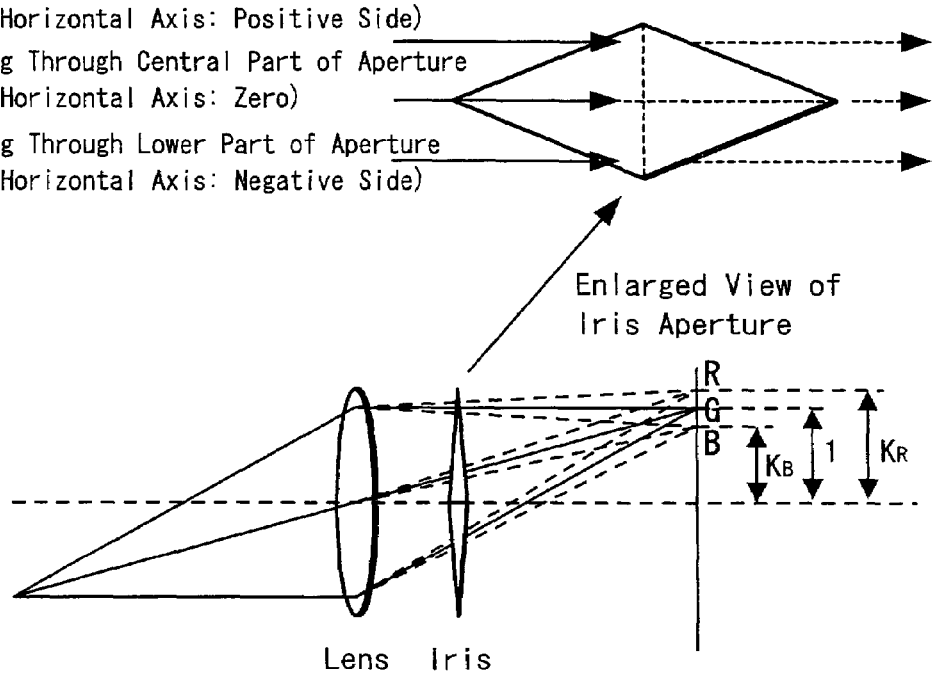
FIG. 5 is a diagram for explaining chromatic aberration and an iris.

Moreover, this conversion ratio for each color calculated in the control microcomputer 8 is supplied to the chromatic aberration correction unit 6. Specifically, ratios KR and KB of a change of an image due to chromatic aberration shown in FIG. 5 [a ratio KR of an image size of red (R) and a ratio KB of an image size of blue (B), where an image size of green (G) is assumed to be 1] are determined according to the aperture amount of the iris 31, the lens image height of the object, the zoom focal length and the focal position of the image pickup lens 1, and the like, and the ratios KR and KB are obtained from these detection signals.

Figure 8:
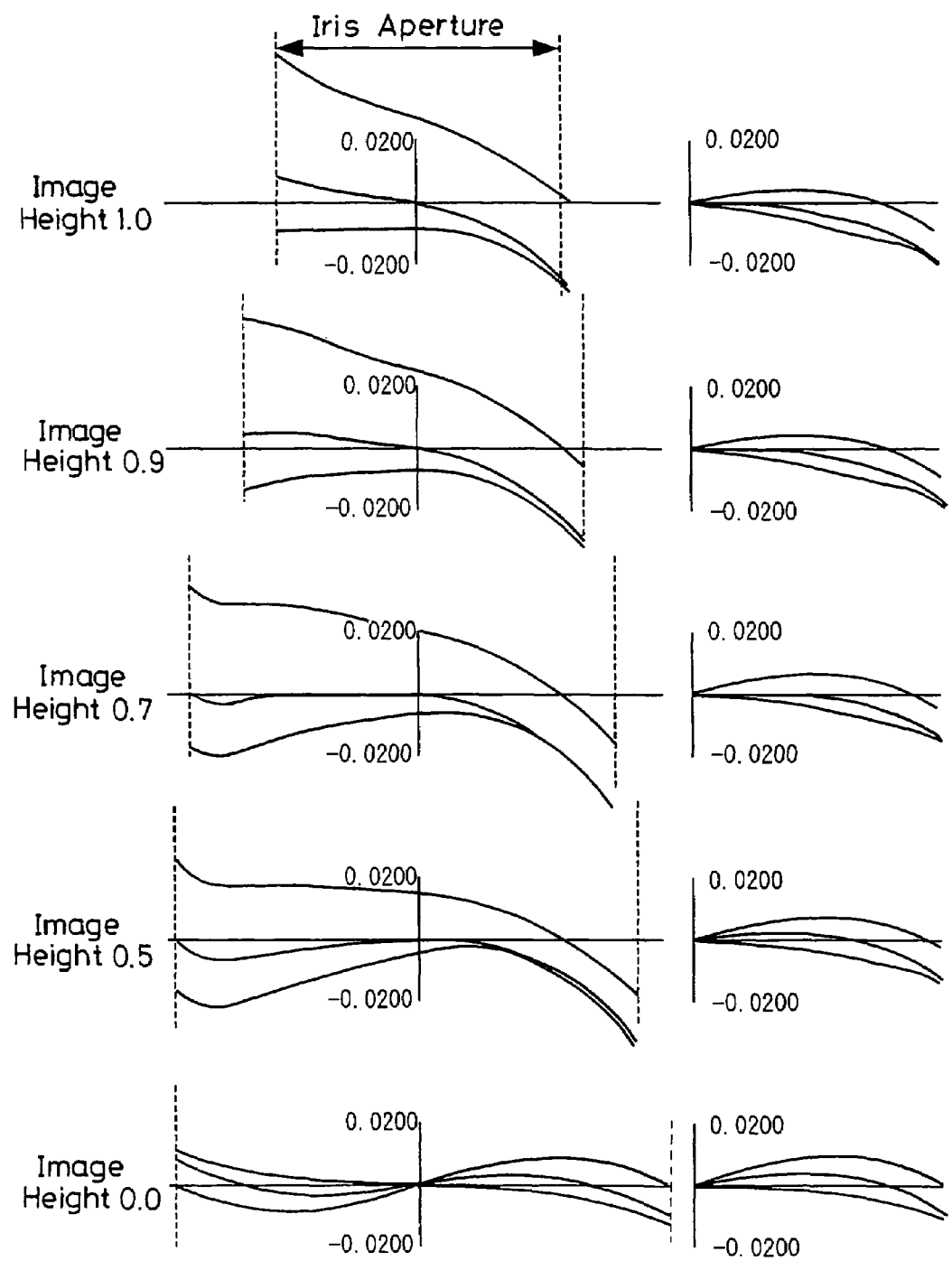
FIG. 8 is a characteristic curve diagram showing a relation between an aperture amount of an iris and a shift amount of a picture-forming position of three primary colors of light at each image height.

First, the ratios KR and KB to the aperture amount of the iris 31 and the lens image height of the object are obtained from the characteristic curve of FIG. 8, for example. Specifically, in FIG. 8, the difference in the vertical direction in each color corresponds to an correction amount. Then, when the image size of the blue light (B) is reduced to match the image of the green light (G), for example, a difference in picture-forming positions of those two colors are read from the characteristic curve of FIG. 8.

Further, when the difference read from the characteristic curve of FIG. 8 is, for example, 20 μm in arbitrary aperture amount of the iris 31 and lens image height of the object and a unit cell size of the image pickup means 2 is 2.7 μm×2.7 μm, for example, the difference becomes 20 μm/2.7 μm=7.4 pixels and the image of the blue light (B) can match with the image of the green light (G) if such correction processing as reducing the whole image by 7.4 pixels is performed on the image of the blue light (B).

Thus, the ratios KR and KB to the aperture amount of the iris 31 and the lens image height of the object can be obtained from the above-described characteristic curve of FIG. 8. Further, since the zoom position and focal position are fixed at a certain point in the characteristic curve of FIG. 8, a final conversion ratio for correction performed in the chromatic aberration correction unit 6 is obtained by adding a ratio according to a zoom focal length, focal position and the like of the image pickup lens 1 to the ratios KR and KB obtained in this manner.

Figure 2:
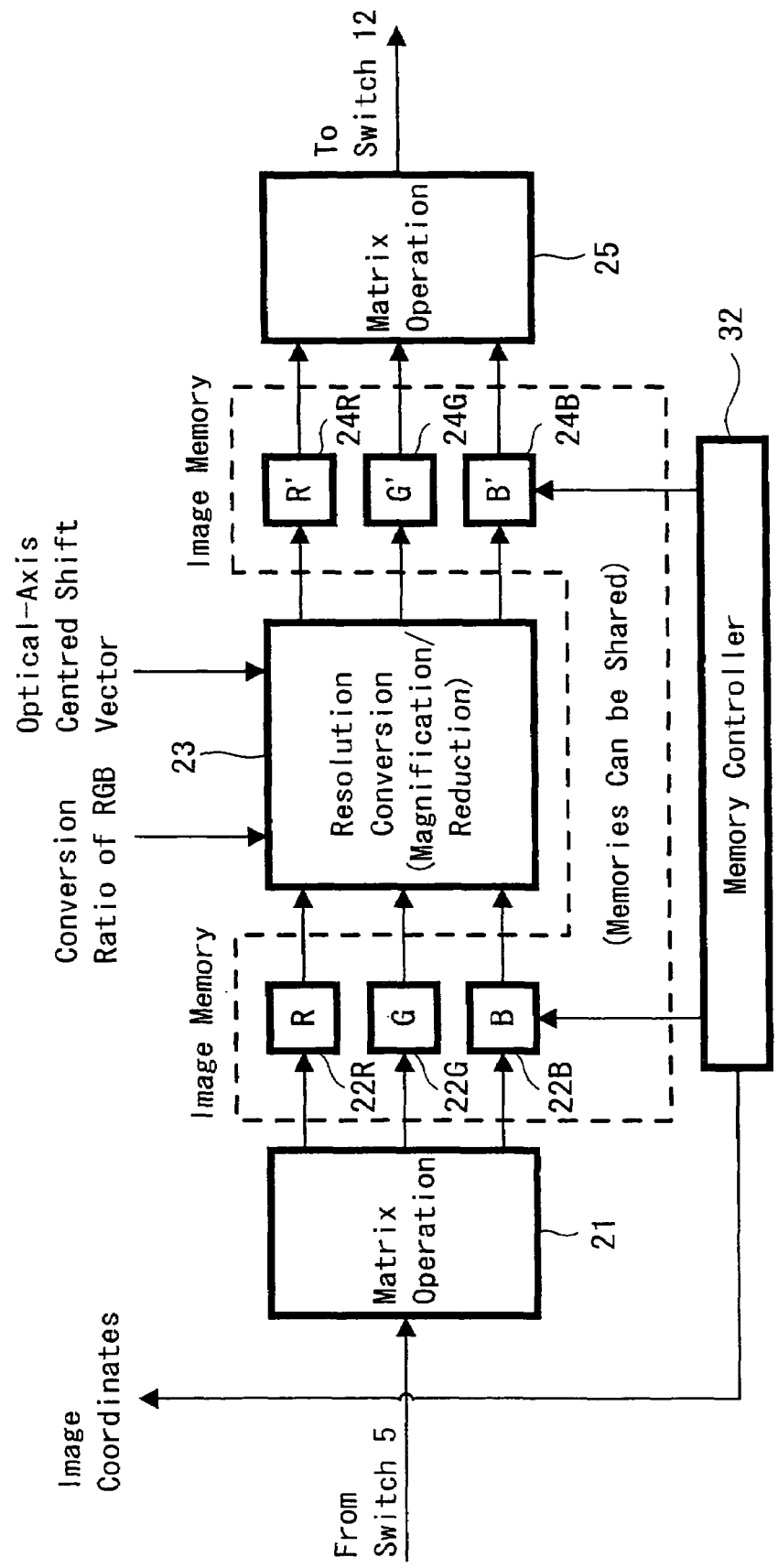
FIG. 2 is a block diagram showing an embodiment of a configuration of a relevant part thereof.

Further, processing as shown in FIG. 2, for example, is performed in the chromatic aberration correction unit 6. Specifically, a signal from the switch 5 is supplied to a matrix operation circuit 21, and a conversion from the above-described luminance (Y) signal and two color-difference (Cb, Cr) signals, for example, into three primary color (R, G, B) signals is performed, for example. These converted three primary color (R, G, B) signals are written into image memories 22R, 22G, and 22B on the input side respectively, and this written image data is supplied to a resolution conversion circuit 23 which performs magnification/reduction of an image.

Furthermore, the above-described data on conversion ratio and data on the shift vector of the optical axis of the image pickup lens are supplied to this resolution conversion circuit 23. Further, in this resolution conversion circuit 23, a position of the optical axis center in the image is determined for each image of red (R), green (G), and blue (B) in accordance with the above-described data on the shift vector of the optical axis of the image pickup lens, and a resolution conversion for the magnification/reduction of the image is performed in accordance with the above-described data on the conversion ratio with this position as a center.

Then, the image data from this resolution conversion circuit 23 are written into image memories 24R, 24G, and 24B on the output side. Note that the image memories of 22R, 22G, and 22B can be shared with the image memories of 24R, 24G, and 24B. Further, the image data written into the image memories 24R, 24G, and 24B are read out and supplied to a matrix operation circuit 25, and a conversion is performed from the three primary color (R, G, B) signals, for example, into luminance (Y) signal and two color-difference (Cb, Cr) signals, for example.

Accordingly, when an image having chromatic aberration as shown in the left end of FIG. 3B compared with an image ideally focused as shown in FIG. 3A is supplied, for example, this image is separated into three primary colors (R, G, B), the image of red (R) is reduced and the image of blue (B) is magnified among those three colors, for example, in the resolution conversion circuit 23 so that the size of each image is made equal. Then, those images of three primary colors (R, G, B) are again combined, and an image close to the image ideally focused as shown in the right end of FIG. 3B is formed.

Further, by supplying this image data to a matrix operation circuit 25, image data again formed into the image close to the ideally focused image in the above-described resolution conversion circuit 23 is again converted into the luminance (Y) signal and two color-difference (Cb, Cr) signals, for example, and are taken out from the chromatic aberration correction unit 6. Then, either the luminance (Y) signal and two color-difference (Cb, Cr) signals which are taken out from this chromatic aberration correction unit 6, or the input signal to the chromatic aberration correction unit 6 is selected by a switch 12.

The signal selected by this switch 12 is supplied to a display processing circuit 13, and image data in which the luminance (Y) signal and two color-difference (Cr, Cb) signals, for example, are converted into a display signal of a predetermined format is supplied to a display apparatus 14 such as a liquid crystal display and the display is performed. Alternatively, the signal selected by this switch 12 can also be supplied to external output means (not illustrated) to be output to an external video apparatus or the like.

Further, the signal selected by the switch 12 is supplied to a data compression circuit 15, and compressed image data is supplied through a data insertion circuit 16 to a recording and reproducing apparatus 17 to be recorded in a recording medium such as a flexible disk and a semiconductor memory card. Moreover, a reproduced signal from the recording and reproducing apparatus 17 is supplied to a data decompression circuit 18. Then, decompressed image data is supplied to the switch 5 so that either the decompressed image data or the output signal from the above-described camera signal processing circuit 4 can be selected.

Therefore, in this apparatus, image data picked up by the image pickup means 2, for example, is displayed in the display apparatus 14 after the chromatic aberration is corrected in the chromatic aberration correction unit 6 and the corrected image data is recorded in the recording medium in the recording and reproducing apparatus 17. In addition, the image data reproduced from the recording medium in the recording and reproducing apparatus 17 is also displayed in the display apparatus 14 after the chromatic aberration is corrected in the chromatic aberration correction unit 6, and the corrected image data is also recorded in the recording medium in the recording and reproducing apparatus 17.

Accordingly, image data, for example, recorded in a recording medium without correcting the chromatic aberration when picking up the image is displayed in the display apparatus 14 after the chromatic aberration of this image data is corrected, and the image data recorded in the recording medium in the recording and reproducing apparatus 17 can be rewritten using this corrected image data. Specifically, when there is no time for performing the correction in continuous shooting and the like, only recording is performed at the time of photographing and the correction can be performed at the time of reproduction to re-record corrected data.

Further, in this case, the correction processing of the chromatic aberration of the image data at the time of reproduction can be performed smoothly by recording data on the optical axis-centered shift vector when picking up the image and data on the conversion ratio, for example, together with the image data.

Specifically, in the above-described apparatus, the data on the optical axis-centered shift vector from the camera shake correction vector calculation unit 9 and the data on the conversion ratio from the conversion ratio calculation unit 10, for example, are made into a predetermined data format in a data I/O circuit 19, and are inserted into the image data from the data compression circuit 15 in the data insertion circuit 16. Further, the data included in the signal reproduced from the recording and reproducing apparatus 17 is obtained in the data I/O circuit 19 and is supplied to the chromatic aberration correction unit 6 at the time of reproduction.

Accordingly, in the case where there is no time for performing the correction when picking up the image such as in continuous shooting and the like, the data on the optical axis-centered shift vector when picking up the image and the data on the conversion ratio, for example, are recorded together with the image data. Then, at the time of reproduction, the correction processing of the chromatic aberration of the image data can be performed smoothly using these data on the optical axis-centered shift vector and data on the conversion ratio which are recorded together with the image data, and the re-recording of the corrected data can also be performed.

However, correction using such optical axis-centered shift vector data at the time of image pick-up and conversion ratio data can only be performed in the case in which recording and reproduction are performed using the same camera apparatus. Specifically, the optical axis center of an image pickup lens slightly differs even if a model is the same, and data recorded using another camera apparatus may not be corrected. Then, when judging whether the recording and reproduction are performed by the same camera apparatus, an ID code of individual apparatus, for example, is recorded together with the data.

Further, in the above-described apparatus, the conversion ratio calculation unit 10 is provided with, for example, an arbitrary user interface input 20, with which the above-described conversion ratio data, for example, is changed arbitrarily and the correction ratio in the chromatic aberration correction unit 6 is arbitrarily set. Accordingly, a desired correction can be performed using this user interface input 20 in the case of image data recorded using another camera apparatus, for example, and of image data in which the conversion ratio data is not recorded together with the image data.

Furthermore, when desired correction is performed using such user interface input 20, the image before the correction in the chromatic aberration correction unit 6 and the image after the correction can arbitrarily be switched and displayed on the display apparatus 14 with arbitrarily selecting the image data by the switch 12, for example. Accordingly, the image before the collection and the image after the correction can easily be compared, and an operation by a user at the time of desired correction can be performed smoothly.

The image data can also be selected by the switch 12, when the display apparatus 14 is used as a view finder and when the image data already corrected is displayed on the display apparatus 14 without passing through the chromatic aberration correction unit 6, for example. In addition, the image data is also selected by the switch 12, when only recording is performed without performing the correction at the time of picking up the image in the above-described continuous shooting and the like. However, when a through mode to output an input into the chromatic aberration correction unit 6 without any processing is provided, this through mode can also be used as an alternative to the switch 12.

Therefore, in the embodiment described above, means for performing the magnification or reduction of the image with respect to each color of the primary color signals and means for detecting the aperture amount of the iris lens and the lens image height of the object in the image pickup are used to control the conversion coefficient and optical axis-centered coordinates for the magnification or reduction of the image in accordance with the detection output, so that the picture-quality degradation that occurs in the miniaturized image pickup lens can be corrected by the processing of the picked-up image signal, and excellent correction processing can also be performed on the aperture amount of the iris and the lens image height of the object in the image pickup lens.

Therefore, according to the present invention, problems in conventional means, in which the picture-quality degradation such as the color blurring and resolution degradation is caused by the magnification chromatic aberration due to the miniaturization of the image pickup lens and so forth, it has been difficult to sufficiently control such picture-quality degradation only by the image pickup lens, and furthermore there is a necessity of also correcting the color shift occurred in the image pickup lens regarding the aperture amount of the iris and the lens image height of the object in the image pickup lens, can be solved easily.

In the above-described embodiment, coordinates of the point where the processing of the image is performed are used as the lens image height. Specifically, in FIG. 2 the coordinates of the point where the processing of the image is performed is obtained based on an address supplied to the image memories 22R, 22G, and 22B from a memory controller 32. Then, the coordinates of the point in the image where the processing is performed at present are supplied to the control microcomputer 8 that calculates the resolution conversion ratio in the block diagram of FIG. 1.

Therefore, in the control microcomputer 8, it is considered that a difference between the coordinates under processing and the coordinates of the lens center is equivalent to the lens image height, and the amount of chromatic aberration is calculated based on this difference to obtain the resolution conversion ratio. However, with this method, there is a possibility that a circuit scale, processing time, power consumption, control software, lens data storage memory, and the like become enormously large.

Then, it is considered to reduce those circuit scale and so on using automatic focus processing that is employed in a video camera or digital still camera, for example. Hereupon, the following processing is typically known as automatic focusing, for example.

Specifically, in FIG. 1, one kind or several kinds of high pass filters having varied central frequencies and amplitudes of passing band are provided as a detection circuit 33. While monitoring the output (detected) from the filter, the closer an image comes to the focusing point, the more details (high frequency part) of the image appears such that a detection result becomes larger. In addition, one kind or several kinds of detection frames are arranged. Then, an object that should be focused or an object that should not be focused is detected in an image while moving these detection frames and changing the sizes thereof.

Then, after a focal point is detected in the image while moving the detection frame for automatic focusing and changing the size thereof, a distance from coordinates of this focal point to the coordinates of the lens axis center is regarded as a value of the lens image height, an amount of chromatic aberration correction with emphasis on the lens image height is calculated and thereby the optimal chromatic aberration correction is performed on a finely defined portion that comes into focus in an output image to obtain a great effectiveness in picture-quality improvement.

In other words, a method of controlling chromatic aberration correction can be simplified greatly when performing processing of a representative point with putting much emphasis on a focused portion even if an image height is not corresponding to each portion of an image.

Figure 4A:
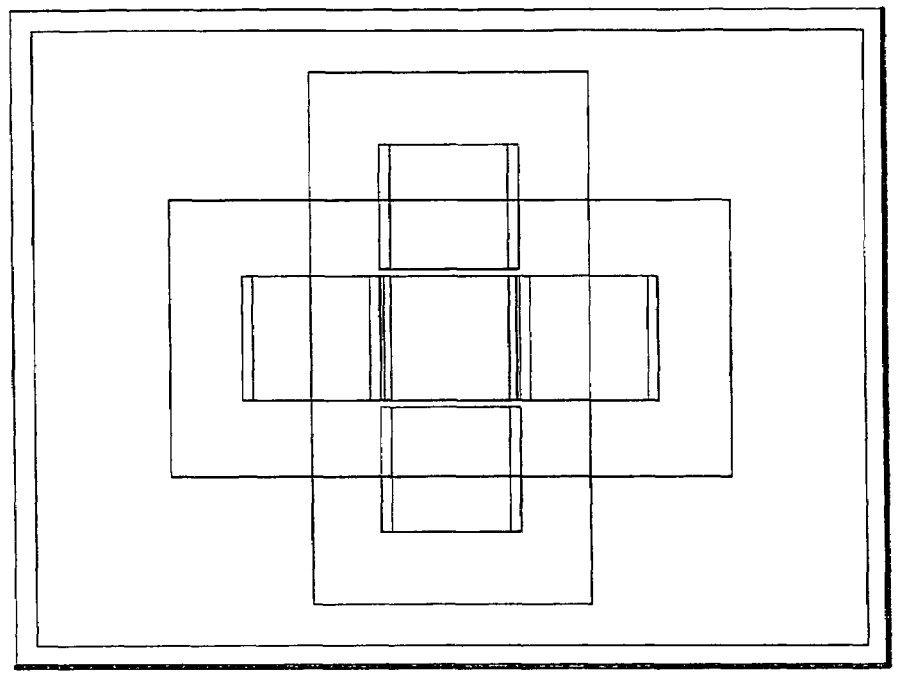
FIGS. 4A and 4B are diagrams for explaining automatic focus processing.

Here, specifically, it is assumed that there are detection frames for automatic focusing as shown in FIG. 4A, for example, and a movement and size change of each frame is possible. The detection frames for automatic focusing are generally multiplexed frames at the center of an image and the vicinity thereof, and are used to detect an appearance of an object coming in and going out an inside frame. In addition, there is also a frame to detect the whole screen in a case where a point to focus is unrecognizable or in a case of performing initial state processing.

Figure 4B:
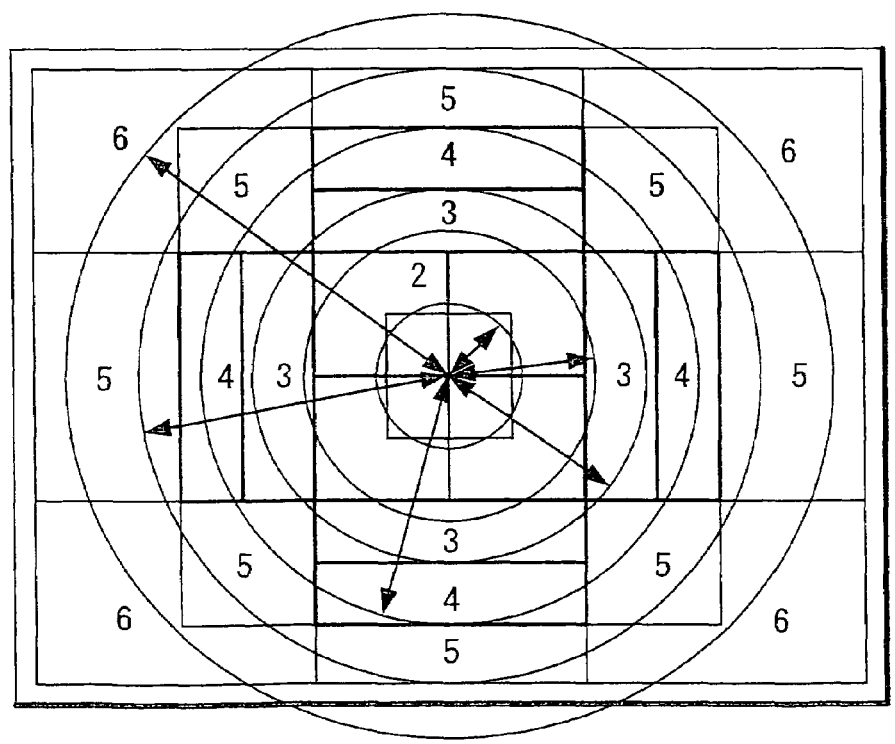

Then, these detection frames are used to correspond with the lens image height that is the distance from the lens center coordinates as shown in FIG. 4B. Specifically, kinds of image height are classified into several ones from 1 to 6 in approximately concentric manner in FIG. 4B. Further, in the case where a focused object exists, for example, in a field of "3" of FIG. 4B, a difference between this field of "3" and the lens center coordinates is regarded as the lens image height, an amount of chromatic aberration correction corresponding thereto is calculated, and the whole screen is processed using the optimal resolution conversion ratio for the field of "3".

Accordingly, the optimal chromatic aberration correction can be performed on a finely defined portion that comes into focus, the chromatic aberration correction for an unfocused portion can be simplified, and a circuit scale, processing time, power consumption, control software, lens data storage memory, and the like can be reduced greatly.

Thus, according to the above-described image recording and reproducing apparatus, an image pickup lens, image pickup means for converting image light that passes through the image pickup lens into an electrical image signal, camera signal processing means for processing the image signal, color signal conversion means for converting or inversely converting an output signal from the camera signal processing means into at least three primary color signals, resolution conversion means for performing magnification or reduction of an image of each color of the primary color signals, detection means for detecting a driving state of an iris and a lens image height of an object in the image pickup lens, and control means for controlling a conversion coefficient and optical axis-centered coordinates for the magnification or reduction in the resolution conversion means in accordance with a detection output from the detection means are included, so that the picture-quality degradation that occurs, for example, in the miniaturized image pickup lens can be corrected excellently.

Further, according to the above-described image pickup apparatus, an image pickup lens, image pickup means for converting image light that passes through the image pickup lens into an electrical image signal, camera signal processing means for processing the image signal, color signal conversion means for converting or inversely converting an output signal from the camera signal processing means into at least three primary color signals, resolution conversion means for performing magnification or reduction of an image on each color of the primary color signal, detection means for detecting a driving state of an iris and a lens image height of an object in the image pickup lens, and control means for controlling a conversion coefficient and optical axis-centered coordinates for the magnification or reduction in the resolution conversion means in accordance with a detection output from the detection means are included, so that the picture-quality degradation that occurs, for example, in the miniaturized image pickup lens can be corrected excellently.

Further, according to the above-described chromatic aberration correcting method employed in an image recording and reproducing apparatus or image pickup apparatus including an image pickup lens, image pickup means for converting image light that passes through the image pickup lens into an electrical image signal, and camera signal processing means for processing the image signal, an output signal from the camera signal processing means is converted into at least three primary color signals, magnification or reduction of an image is performed on each color of the primary color signals, a driving state of an iris and a lens image height of an object in the image pickup lens are detected, and a conversion coefficient and optical axis-centered coordinates for the magnification or reduction are controlled in accordance with a detection output thereof, so that the picture-quality degradation that occurs, for example, in the miniaturized image pickup lens can be corrected excellently.

Having described embodiments of the present invention, it is to be understood that the present invention is not limited to those embodiments and that various modifications could be effected without departing from the spirit or scope of the invention.

The invention claimed is:

1. An image recording and reproducing apparatus comprising:
   an image pickup lens;
   image pickup means for converting image light that passes through said image pickup lens into an electrical image signal;
   camera signal processing means for processing said image signal;
   color signal conversion means for converting or inversely converting an output signal from said camera signal processing means into at least three primary color signals;
   resolution conversion means for performing magnification or reduction of an image on each color of said primary color signal;
   detection means for detecting a driving state of an iris and a lens image height of an object in said image pickup lens; and
   control means for controlling a conversion coefficient and optical axis-centered coordinates for the magnification or reduction in said resolution conversion means in accordance with a detection output from said detection means.

2. An image recording and reproducing apparatus according to claim 1, further comprising:
   signal conversion means for converting or inversely converting an output signal from said resolution conversion means into an external output image signal or a recording image signal, and
   external output means for outputting said external output image signal and/or recording and reproducing means for recording or reproducing said recording image signal in a recording medium.

3. An image recording and reproducing apparatus according to claim 2,
   wherein the output signal from said camera signal processing means is recorded in said recording medium in said recording and reproducing means, and
   information on the driving state of the iris and the lens image height of the object in said image pickup lens detected by said detection means when picking up the image, or correction information corresponding thereto, is recorded in said recording medium together with the output signal from said camera signal processing means.

4. An image recording and reproducing apparatus according to claim 1, further comprising:
   switch means for switching between the output signal from said camera signal processing means and an image signal from arbitrary external input means or recording and reproducing means,
   wherein a signal from said switch means is supplied to said color signal conversion means, and
   said control means is provided with a user interface for performing arbitrary settings to said conversion coefficient and optical axis-centered coordinates for the magnification or reduction.

5. An image recording and reproducing apparatus according to claim 4,
   wherein information on said driving state of the iris and the lens image height of the object in the image pickup lens detected by said detection means when picking up the image signal, or correction information corresponding thereto, is recorded together with said image signal in the recording medium reproduced in said recording and reproducing means, and
   the conversion coefficient and the optical axis-centered coordinates for the magnification or reduction in said resolution conversion means are controlled in accordance with said information reproduced in said recording and reproducing means.

6. An image recording and reproducing apparatus according to claim 1,
   wherein a difference between detected pixel coordinates and optical axis-centered coordinates on a screen is used to detect said lens image height of the object.

7. An image recording and reproducing apparatus according to claim 1, further comprising:
   automatic focus adjusting means capable of controlling a focusing position,
   wherein coordinates of said controlled focusing position are made to represent said detected pixels of the whole screen to be used for detecting said lens image height of the object.

8. An image recording and reproducing apparatus according to claim 1,
   wherein a said driving state and an amount of camera shake correction of image pickup lens are further detected, and
   the conversion coefficient for the magnification or reduction and the optical axis-centered coordinates for said magnification or reduction are controlled in said resolution conversion means, in accordance with said further detected output in addition to said detected output.

9. An image pickup apparatus comprising:
an image pickup lens;
image pickup means for converting image light that passes through said image pickup lens into an electrical image signal;
camera signal processing means for processing said image signal;
color signal conversion means for converting or inversely converting an output signal from said camera signal processing means into at least three primary color signals;
resolution conversion means for performing magnification or reduction of an image with respect to each color of said primary color signals;
detection means for detecting a driving state of an iris and a lens image height of an object in said image pickup lens; and
control means for controlling a conversion coefficient and optical axis-centered coordinates for the magnification or reduction in said resolution conversion means in accordance with a detection output from said detection means.

10. An image pickup apparatus according to claim 9, further comprising:
signal conversion means for converting or inversely converting an output signal from said resolution conversion means into an external output image signal or a recording image signal, and
external output means for outputting said external output image signal and/or recording and reproducing means for recording or reproducing said recording image signal in a recording medium.

11. An image pickup apparatus according to claim 10, wherein the output signal from said camera signal processing means is recorded in said recording medium in said recording and reproducing means, and
information on the driving state of the iris and the lens image height of the object in said image pickup lens detected by said detection means when picking up the image, or correction information corresponding thereto, is recorded in said recording medium together with the output signal from said camera signal processing means.

12. An image pickup apparatus according to claim 9, further comprising:
switch means for switching between the output signal from said camera signal processing means and an image signal from arbitrary external input means or recording and reproducing means,
wherein a signal from said switch means is supplied to said color signal conversion means, and
said control means is provided with a user interface for performing arbitrary settings to said conversion coefficient and optical axis-centered coordinates for the magnification or reduction.

13. An image pickup apparatus according to claim 12, wherein information on said driving state of the iris and the lens image height of the object in the image pickup lens detected by said detection means when picking up the image signal, or correction information corresponding thereto, is recorded together with said image signal in the recording medium reproduced in said recording and reproducing means, and
the conversion coefficient and the optical axis-centered coordinates for the magnification or reduction in said resolution conversion means are controlled in accordance with said information reproduced in said recording and reproducing means.

14. An image pickup apparatus according to claim 9, wherein a difference between detected pixel coordinates and optical axis-centered coordinates on a screen is used to detect said lens image height of the object.

15. An image pickup apparatus according to claim 9, further comprising:
automatic focus adjusting means capable of controlling a focusing position,
wherein coordinates of said controlled focusing position are made to represent said detected pixels of the whole screen to be used for detecting said lens image height of the object.

16. An image pickup apparatus according to claim 9, wherein a driving state of said image pickup lens and an amount of camera shake correction are further detected, and
the conversion coefficient for the magnification or reduction and the optical axis-centered coordinates for said magnification or reduction are controlled in said resolution conversion means, in accordance with said further detected output in addition to said detected output.

17. A chromatic aberration correcting method employed in an image recording and reproducing apparatus or image pickup apparatus including an image pickup lens, image pickup means for converting image light that passes through said image pickup lens into an electrical image signal, and camera signal processing means for processing said image signal, comprising the steps of:
converting an output signal from said camera signal processing means into at least three primary color signals;
performing magnification or reduction of an image with respect to each color of said primary color signal; and
detecting a driving state of an iris and a lens image height of an object in said image pickup lens and controlling said conversion coefficient and optical axis-centered coordinates for magnification or reduction in accordance with the detection output thereof.

18. A chromatic aberration correcting method according to claim 17, further comprising the steps of:
converting the output signal from said resolution conversion means into an external output image signal or a recording image signal, and
outputting said external output image signal and/or recording said recording image signal in a recording medium.

19. A chromatic aberration correcting method according to claim 18, further comprising the steps of:
making the output signal from said camera signal processing means capable of being recorded in said recording medium, and
recording information on the driving state of the iris and the lens image height of the object in said image pickup lens detected when picking up the image, or correction information corresponding thereto together with said output signal in said recording medium.

20. A chromatic aberration correcting method according to claim 17 in which said image recording and reproducing apparatus or image pickup apparatus further includes switch means for switching between the output signal from said camera signal processing means and an image signal from an arbitrary external input or from a recording medium, further comprising the steps of:
converting a signal from said switch means into at least three primary color signals, and performing the magnification or reduction of the image with respect to each color of said primary color signal, and performing arbitrary settings to said conversion coefficient and optical axis-centered coordinates for magnification or reduction.

21. A chromatic aberration correcting method according to claim 20, further comprising the steps of:

recording information on the driving state of the iris and the lens image height of the object in said image pickup lens detected when picking up the image signal, or correction information corresponding thereto together with said image signal in said recording medium, and controlling said conversion coefficient and optical axis-centered coordinates for magnification or reduction in accordance with said reproduced information.

22. A chromatic aberration correcting method according to claim 17, wherein a difference between the coordinates of the detected pixel and the optical axis-centered coordinates on the screen is used for detecting said lens image height of the object.

23. A chromatic aberration correcting method according to claim 17 in which said image recording and reproducing apparatus or image pickup apparatus further includes automatic focus adjusting means capable of controlling a focusing position, wherein coordinates of said controlled focusing position is made to represent said detected pixels of the whole screen to be used for detecting said lens image height of the object.

24. A chromatic aberration correcting method according to claim 17, further comprising the steps of:

detecting the driving state and the amount of camera shake correction of said image pickup lens, and controlling said conversion coefficient for magnification or reduction and controlling said optical axis-centered coordinates for magnification or reduction in said resolution conversion means, in accordance with said further detected output in addition to said detected output.

* * * * *